April 23, 1957     W. W. GORDON     2,789,351
TOOTH POSITIONER
Filed May 2, 1955

INVENTOR
WOODFORD W. GORDON
BY
Gardner & Zimmerman
ATTORNEYS

# 2,789,351
TOOTH POSITIONER

Woodford W. Gordon, San Francisco, Calif.

Application May 2, 1955, Serial No. 505,163

6 Claims. (Cl. 32—14)

The present invention relates to orthodontia and in particular to the final positioning of teeth following correction of irregularities therein.

In the straightening of teeth it is common practice to employ metal bands looped about groups of teeth and about selected individual teeth to exert a steady force thereon whereby the teeth are slowly pulled into alignment over a protracted period of time and with numerous adjustments of band tension and location. The bands employed in the above noted operation normally have a nominal thickness, for example 0.004 inch, so that a tooth separation of twice this amount, or 0.008 inch, remains when the bands are removed. It is desirable to position the teeth tightly together as a final step following removal of the bands and to this end there may be employed a tooth positioner which comprises a mold having the impression of a particular set of teeth being positioned and adapted to be clamped between the teeth by biting the positioner. Such a tooth positioner is preferably resilient and shaped to conform to the mouth containing the teeth to be positioned with the individual tooth indentations therein being molded from the individual teeth of the set being straightened but with the teeth openings placed close together in the mold so that upon biting the positioner the teeth are urged into the mating openings and are forced together whereby the gaps between teeth disappear. Such an operation is made feasible by the relative mobility of the teeth following prolonged application of bands thereto and it has been found that use of the teeth positioner for a few hours per day for a period of some weeks, for example six weeks, will suffice to position the teeth in desired close proximity. Heretofore, such positioners were conventionally formed of a unitary mass of gum rubber or the like, and numerous problems are found in the use thereof. For example, if the material is relatively soft, it is difficult to have the same function properly, or a very large mass is needed to obtain the necessary firmness required to urge the teeth into their proper position. Conversely, if a harder rubber material is used, the teeth do not properly adhere to the material and the efficiency of the latter is diminished.

Accordingly, it is an object of the present invention to provide an improved tooth positioner for moving teeth into tight relationship, which overcomes the above recited defects of prior art devices.

It is another object of the present invention to provide an improved tooth positioner having a resilient inner mold encased by a casing of relatively rigid material whereby the natural advantages resulting from the use of the respective materials may be integrated into a single unit.

A further object of the present invention is to provide an improved tooth positioner comprising a pair of arcuate flexible walls containing therebetween a resilient mold of a set of teeth to be positioned together.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

The invention is illustrated in the accompanying drawing wherein.

Figure 1:
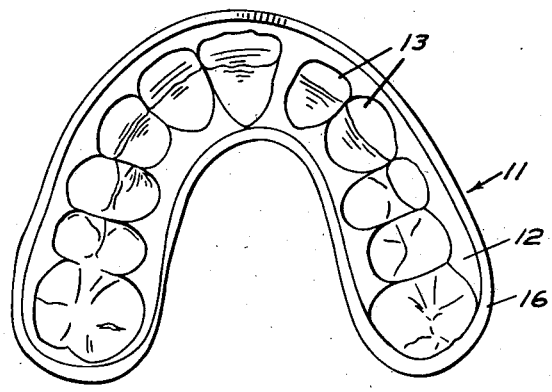
Figure 1 is a plan view of the improved tooth positioner of the invention.
Figure 2:
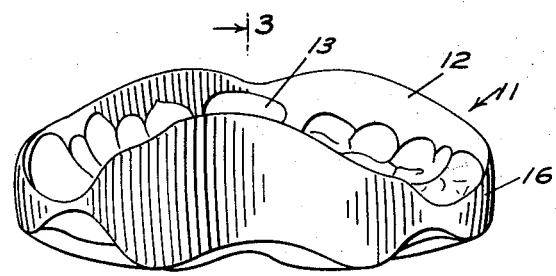
Figure 2 is an elevational view of the improved tooth positioner of the present invention.
Figure 3:
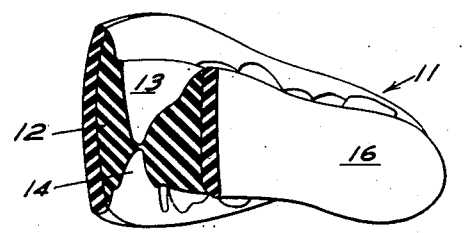
Figure 3 is a sectional view taken at 3—3 of Figure 2.

Considering now the details of the present invention and referring to the drawings, the tooth positioner 11 will be seen to include an arcuate mold 12 formed of a resilient non-toxic material such as pure gum rubber. This mold 12 is individually tailored for a particular set of teeth and the mouth containing same, with a different mold being formed and employed for each different set of teeth. The mold thus has a curvature and other dimensions consistent with the set of teeth to be positioned so as to extend from one end to the other of the set. Upon the upper mold surface there are formed a plurality of successive dentiform indentations 13 corresponding to the individual teeth of the upper plate of the set to be positioned. These individual indentations 13 are formed from castings of the individual teeth of the set and are placed in the mold in the desired close relationship so that as the teeth of the set are formed into mating contact with the mold indentations the teeth are urged together by the mold. The under surface of the mold 12 is similarly formed in that it contains a plurality of dentiform indentations 14 matching the shape of the individual teeth in the lower plate of the teeth to be positioned. These lower indentations are likewise placed in closely spaced relationship to urge the lower plate of teeth mating therewith closer together into desired spacing.

As an important feature of this invention, about the entire arcuate periphery of the mold 12 there is disposed a vertical relatively rigid wall or casing 16 having a limited flexibility and formed for example, of a hard dental rubber such as vulcanite. The casing 16 is bonded to the mold 12 as by vulcanizing, however, any suitable bonding agent may be employed in the instance where other casing material such as plastic or metal is employed. The frontal portion of the outer casing is formed with a substantial height so as to cover the gums of the one clamping the teeth positioner in his mouth and this outer casing is tapered downward along the top toward the posterior portion thereof and upward along the bottom toward the posterior portion thereof so as to assume a minimum height adjacent and behind the back molar indentations in the mold.

With regard to the materials employed in the above-described tooth positioner, the mold or central member 12 may be formed of a pure gum rubber having a hardness of 30–35 Shore durometer-A while the outer member or casing may be formed of an hygenic dental rubber having a hardness of 90 Shore durometer-D. This casing may be formed for example with a pure natural rubber base to which are added non-toxic pigments and vulcanizing agents to get the color and hardness desired.

Application or use of the improved tooth positioner is quite simple in that it is placed in the mouth of the patient for whom it is formed and is bitten with the teeth of the user thus entering the mold indentations. As these indentations are slightly closer together than the teeth engaging same, the teeth are urged together by the resiliency of the mold material and continued use of the positioner in this manner moves the teeth into the close proximity desired. The improved tooth positioner herein described laterally corrects cross-bites as the relatively rigid casing prevents material lateral deformation of the mold and opens closed bite as the resiliency of the mold continually engages and urges the teeth into proper relationship. Also the positioner closes an open bite as the mold material readily adheres to the teeth because of its resiliency so as to apply a continual pressure to a large area of each tooth and this hugging of the teeth by the mold is highly advantageous for all corrective measures produced by the positioner. The structure of the positioner embodying a resilient inner member surrounded by a hard outer member of only limited flexibility provides very good posterior anchorage, reduces the bulk required for such a device otherwise formed and provides a smooth outer shell thereby reducing salivation accompanying use of the positioner.

What is claimed is:

1. An improved tooth positioner comprising a substantially U-shaped resilient mold having a succession of dentiform indentations upon the upper and lower surfaces thereof and adapted to be engaged between the teeth with same mating with the indentations therein, and a flexible casing secured to and extending substantially completely about the outer peripheral surface of the resilient mold and substantially parallel with the indentations therein for limiting deformation of said mold.

2. In a tooth positioner having an arcuate resilient member with dentiform indentations in the upper and lower surfaces thereof for engagement between the upper and lower groups of a set of teeth, a flexible wall disposed substantially completely about the vertical sides of said resilient member and bonded thereto for limiting deformation of said resilient member whereby same tightly engages teeth forced thereagainst.

3. A tooth positioner comprising a central member formed of a resilient and nontoxic material and having an arcuate configuration in a horizontal plane with said curvature corresponding to the line of teeth in a particular set thereof to be positioned, said central member defining upon the upper and lower surfaces thereof a plurality of dentiform indentations individually corresponding to the configuration of teeth in the set of teeth to be positioned, and an outer member bonded to the inner member about substantially the entire vertical periphery of the latter with said outer member having a limited flexibility whereby engagement of a predetermined set of teeth with said central member urges individual teeth of the set into the relative position of the indentations in the central member of the teeth positioner.

4. A tooth positioner as claimed in claim 3 further defined by said outer member having a minimum vertical height at the extremities of said central member and tapering to a maximum height adjacent the center of the central member.

5. A tooth positioner comprising a generally U-shaped mold of resilient material, said mold having a plurality of dentiform recesses upon the upper and lower surfaces thereof and adapted to receive the upper and lower sets of teeth of a patient, and a flexible casing secured to and extending about the edge surfaces of said mold, said casing being formed of a material substantially harder and less resilient than the material of said mold.

6. A device as set forth in claim 5 in which said mold has a hardness of approximately 35 Shore durometer-A, and said casing has a hardness of approximately 90 Shore durometer-D.

References Cited in the file of this patent

UNITED STATES PATENTS

| | | |
|---|---|---|
| 2,531,222 | Kesling | Nov. 21, 1950 |
| 2,678,043 | Stark | May 11, 1954 |